(12) United States Patent
Jackson

(10) Patent No.: US 8,990,881 B2
(45) Date of Patent: Mar. 24, 2015

(54) UPSTREAM BANDWIDTH CONDITIONING DEVICE

(75) Inventor: David H. Jackson, Manlius, NY (US)

(73) Assignee: PPC Broadband, Inc., East Syracuse, NY (US)

( * ) Notice: Subject to any disclaimer, the term of this patent is extended or adjusted under 35 U.S.C. 154(b) by 1011 days.

(21) Appl. No.: 12/534,971

(22) Filed: Aug. 4, 2009

(65) Prior Publication Data

US 2010/0251323 A1    Sep. 30, 2010

Related U.S. Application Data

(60) Provisional application No. 61/164,804, filed on Mar. 30, 2009, provisional application No. 61/186,691, filed on Jun. 12, 2009.

(51) Int. Cl.
  *H04N 7/16* (2011.01)
  *H04N 21/61* (2011.01)
  *H04N 21/442* (2011.01)

(52) U.S. Cl.
  CPC ..... *H04N 21/6168* (2013.01); *H04N 21/44245* (2013.01)
  USPC .......................................... 725/149; 725/148

(58) Field of Classification Search
  USPC ................................. 725/148, 149
  See application file for complete search history.

(56) References Cited

U.S. PATENT DOCUMENTS

| | | | |
|---|---|---|---|
| 3,790,909 A | 2/1974 | Le Fevre | |
| 3,924,187 A | 12/1975 | Dormans | |
| 4,512,033 A | 4/1985 | Schrock | |
| 4,520,508 A | 5/1985 | Reichert, Jr. | |
| 4,648,123 A | 3/1987 | Schrock | |
| 4,677,390 A | 6/1987 | Wagner | |
| 4,961,218 A | 10/1990 | Kiko | |
| 4,982,440 A | 1/1991 | Dufresne et al. | |
| 5,010,399 A | 4/1991 | Goodman et al. | |

(Continued)

FOREIGN PATENT DOCUMENTS

| | | |
|---|---|---|
| JP | 55080989 A | 6/1980 |
| JP | 55132126 A | 10/1980 |

(Continued)

OTHER PUBLICATIONS

PCT/US2010/024281. International Search Report and Written Opinion. Date of Mailing: Sep. 29, 2010. 9 pp.

(Continued)

*Primary Examiner* — Robert Hance
(74) *Attorney, Agent, or Firm* — Hiscock & Barclay, LLP

(57) ABSTRACT

An upstream bandwidth conditioning device that can be inserted into a signal transmission line of a CATV system in or proximate to a premise of a user includes a main signal path divided into a forward path and a return path, the return path being divided into supplier side portion and a user side portion. The device further includes a supplier side termination device selectively connected to the supplier side portion by a supplier side termination switch, and a user side termination device selectively connected to the user side portion by a user side termination switch. A signal amplifier is selectively connected to the supplier side portion and the user side portion by at least one amplifier switch, and a switch controller is configured to actuate each of the supplier side termination switch, the user side termination switch, and the amplifier switch from a first position to a second position.

50 Claims, 5 Drawing Sheets

(56) References Cited

U.S. PATENT DOCUMENTS

| | | | |
|---|---|---|---|
| 5,014,309 A | 5/1991 | West, Jr. | |
| 5,126,840 A | 6/1992 | Dufresne et al. | |
| 5,214,505 A | 5/1993 | Rabowsky et al. | |
| 5,231,660 A | 7/1993 | West, Jr. | |
| 5,369,642 A | 11/1994 | Shioka et al. | |
| 5,548,255 A | 8/1996 | Spielman | |
| 5,745,836 A | 4/1998 | Williams | |
| 5,768,682 A | 6/1998 | Peyrovian | |
| 5,815,794 A | 9/1998 | Williams | |
| 5,839,052 A | 11/1998 | Dean et al. | |
| 5,881,362 A | 3/1999 | Eldering et al. | |
| 5,893,024 A * | 4/1999 | Sanders et al. | 725/125 |
| 5,937,330 A | 8/1999 | Vince et al. | |
| 5,950,111 A | 9/1999 | Georger et al. | |
| 5,970,053 A | 10/1999 | Schick et al. | |
| 5,990,929 A | 11/1999 | Sandaluk | |
| 6,014,547 A | 1/2000 | Caporizzo et al. | |
| 6,049,693 A | 4/2000 | Baran et al. | |
| 6,069,960 A | 5/2000 | Mizukami et al. | |
| 6,094,211 A | 7/2000 | Baran et al. | |
| H1858 H * | 9/2000 | Ibelings | 725/121 |
| 6,199,207 B1 | 3/2001 | Jelinek et al. | |
| 6,205,138 B1 | 3/2001 | Nihal et al. | |
| 6,348,837 B1 | 2/2002 | Ibelings | |
| 6,348,955 B1 | 2/2002 | Tait | |
| 6,373,349 B2 | 4/2002 | Gilbert | |
| 6,377,316 B1 | 4/2002 | Mycynek et al. | |
| 6,388,539 B1 | 5/2002 | Rice | |
| 6,425,132 B1 | 7/2002 | Chappell | |
| 6,495,998 B1 | 12/2002 | Terreault | |
| 6,498,925 B1 | 12/2002 | Tauchi | |
| 6,510,152 B1 | 1/2003 | Gerszberg et al. | |
| 6,560,778 B1 | 5/2003 | Hasegawa | |
| 6,570,928 B1 | 5/2003 | Shibata | |
| 6,587,012 B1 | 7/2003 | Farmer et al. | |
| 6,600,900 B1 | 7/2003 | Palinkas | |
| 6,622,304 B1 | 9/2003 | Carhart | |
| 6,640,338 B1 | 10/2003 | Shibata | |
| 6,678,893 B1 | 1/2004 | Jung | |
| 6,683,513 B2 | 1/2004 | Shamsaifar et al. | |
| 6,725,462 B1 | 4/2004 | Kaplan | |
| 6,728,968 B1 | 4/2004 | Abe et al. | |
| 6,757,910 B1 | 6/2004 | Bianu | |
| 6,804,828 B1 | 10/2004 | Shibata | |
| 6,845,232 B2 | 1/2005 | Darabi | |
| 6,868,552 B1 | 3/2005 | Masuda et al. | |
| 6,877,166 B1 | 4/2005 | Roeck et al. | |
| 6,888,883 B1 * | 5/2005 | Schwartzman et al. | 375/222 |
| 6,928,175 B1 | 8/2005 | Bader et al. | |
| 7,003,275 B1 | 2/2006 | Petrovic | |
| 7,029,293 B2 | 4/2006 | Shapson et al. | |
| 7,039,432 B2 | 5/2006 | Strater et al. | |
| 7,162,731 B2 | 1/2007 | Reidhead et al. | |
| 7,283,479 B2 | 10/2007 | Ljungdahl et al. | |
| 7,454,252 B2 | 11/2008 | El-Sayed | |
| 7,505,819 B2 | 3/2009 | El-Sayed | |
| 7,530,091 B2 | 5/2009 | Vaughan | |
| 7,555,309 B2 * | 6/2009 | Baldor et al. | 455/550.1 |
| 2001/0016950 A1 | 8/2001 | Matsuura | |
| 2002/0141347 A1 | 10/2002 | Harp et al. | |
| 2002/0144292 A1 | 10/2002 | Uemura et al. | |
| 2002/0166124 A1 | 11/2002 | Gurantz et al. | |
| 2004/0172659 A1 | 9/2004 | Ljungdahl et al. | |
| 2004/0229561 A1 | 11/2004 | Cowley et al. | |
| 2005/0034168 A1 | 2/2005 | Beveridge | |
| 2005/0183130 A1 | 8/2005 | Sadja et al. | |
| 2005/0283815 A1 | 12/2005 | Brooks et al. | |
| 2005/0289632 A1 | 12/2005 | Brooks et al. | |
| 2006/0015921 A1 | 1/2006 | Vaughan | |
| 2006/0205442 A1 | 9/2006 | Phillips et al. | |
| 2006/0271986 A1 * | 11/2006 | Vogel | 725/111 |
| 2006/0282871 A1 | 12/2006 | Yo | |
| 2007/0288981 A1 | 12/2007 | Mitsuse et al. | |
| 2007/0288982 A1 | 12/2007 | Donahue | |
| 2008/0022344 A1 | 1/2008 | Riggsby | |
| 2008/0040764 A1 | 2/2008 | Weinstein et al. | |
| 2008/0127287 A1 | 5/2008 | Alkan et al. | |
| 2009/0031391 A1 | 1/2009 | Urbanek | |
| 2009/0047917 A1 | 2/2009 | Phillips et al. | |
| 2009/0077608 A1 | 3/2009 | Romerein et al. | |
| 2010/0095344 A1 * | 4/2010 | Newby et al. | 725/125 |

FOREIGN PATENT DOCUMENTS

| | | |
|---|---|---|
| JP | 57091055 A | 6/1982 |
| JP | 58101582 A | 6/1983 |
| JP | 61157035 A | 7/1986 |
| JP | 05899913 | 7/1987 |
| JP | 05191416 A | 7/1993 |
| JP | 07038580 A | 2/1995 |
| JP | 11069334 A | 3/1999 |
| JP | 2001016557 A | 1/2001 |
| JP | 2001177580 A | 6/2001 |
| JP | 2001326916 A | 11/2001 |
| JP | 2004080483 A | 3/2004 |
| JP | 2005005875 A | 1/2005 |
| JP | 2007166109 A | 6/2007 |
| JP | 2007166110 A | 6/2007 |
| WO | WO-0024124 A1 | 4/2000 |
| WO | WO-0172005 A1 | 9/2001 |
| WO | WO-0233969 A1 | 4/2002 |
| WO | WO-02091676 A1 | 11/2002 |

OTHER PUBLICATIONS

PCT/US2010/024281. International Preliminiary Report on Patentability. Date of Mailing: Oct. 13, 2011. 6 pp.

* cited by examiner

UPSTREAM BANDWIDTH CONDITIONING DEVICE

CROSS REFERENCE TO RELATED APPLICATIONS

This application claims priority under 35 U.S.C. §119(e) to U.S. Provisional Patent Application No. 61/164,804 entitled "UPSTREAM BANDWIDTH CONDITIONING DEVICE" filed Mar. 30, 2009, and U.S. Provisional Patent Application No. 61/186,691 entitled "UPSTREAM BANDWIDTH CONDITIONING DEVICE" filed on Jun. 12, 2009 which are incorporated herein by reference.

FIELD OF THE INVENTION

The present invention relates generally to signal conditioning devices for use in cable television ("CATV") systems, and in particular to signal conditioning devices that increase the signal-to-noise ratio of an upstream bandwidth in a CATV system.

BACKGROUND OF THE INVENTION

The use of a CATV system to provide internet, voice over internet protocol ("VOIP") telephone, television, security, and music services is well known in the art. In providing these services, a downstream bandwidth (i.e., radio frequency ("RF") signals, and/or digital signals, optical signals) is passed from a supplier of the services to a user, and an upstream bandwidth (i.e., RF signals, digital signals, and/or optical signals) is passed from the user to the supplier. For much of the distance between the supplier and the user, the downstream bandwidth and the upstream bandwidth make up a total bandwidth that is passed via a signal transmission line, such as a coaxial cable. The downstream bandwidth is, for example, signals that are relatively higher frequencies within a total bandwidth of the CATV system, while the upstream bandwidth is, for example, signals that are relatively lower frequencies.

Traditionally, the CATV system includes a head end facility, where the downstream bandwidth is initiated into a main CATV distribution system, which typically includes a plurality of trunk lines, each serving at least one local distribution network. In turn, the downstream bandwidth is passed to a relatively small number (e.g., approximately 100 to 500) of users associated with a particular local distribution network. Devices, such as high-pass filters, are positioned at various points within the CATV system to ensure the orderly flow of the downstream bandwidth from the head end facility, through the trunk lines, through the local distribution networks, and ultimately to the users.

In contrast to the orderly flow of the downstream bandwidth, the upstream bandwidth passing through each of the local distribution networks is a compilation of an upstream bandwidth generated within a premise of each user that is connected to the particular local distribution network. The upstream bandwidth generated within each premise includes desirable upstream information signals from a modem and/or a set-top-box, and undesirable interference signals, such as noise or other spurious signals. Many generators of such undesirable interference signals are electrical devices that inadvertently generate electrical signals as a result of their operation. These devices include vacuum cleaners, electric motors, household transformers, welders, and many other household electrical devices. Many other generators of such undesirable interference signals include devices that intentionally to create RF signals as part of their operation. These devices include wireless home telephones, cellular telephones, wireless internet devices, CB radios, personal communication devices, etc. While the RF signals generated by these latter devices are desirable for their intended purposes, these signals will conflict with the desirable upstream information signals if they are allowed to enter the CATV system.

Undesirable interference signals, whether they are inadvertently generated electrical signals or intentionally created RF signals, may be allowed to enter the CATV system, typically through an unterminated port, an improperly functioning device, a damaged coaxial cable, and/or a damaged splitter. As mentioned above, the downstream/upstream bandwidth is passed through coaxial cables for most of the distance between the user and the head end. This coaxial cable is intentionally shielded from undesirable interference signals by a conductive layer positioned radially outward from a center conductor and positioned coaxial with the center conductor. Similarly, devices connected to the coaxial cable typically provided shielding from undesirable interference signals. However, when there is no coaxial cable or no device connected to a port the center conductor is exposed to any undesirable interference signals and will function like a small antenna to gather those undesirable interference signals. Similarly, a coaxial cable or device having damaged or malfunctioning shielding may also gather undesirable interference signals.

In light of the forgoing, it should be clear that there is an inherent, system-wide flaw that leaves the upstream bandwidth open and easily impacted by any single user. For example, while the downstream bandwidth is constantly monitored and serviced by skilled network engineers, the upstream bandwidth is maintained by the user, who is without the skill or knowledge required to reduce the creation and passage of interference signals into the upstream bandwidth. This issue is further compounded by the number of users connected together within a particular local distribution network, especially knowing that one user can easily impact all of the other users.

One method for maintaining an overall high signal quality of the upstream bandwidth is to implement a device that amplifies the signal strength of a particular user's the upstream bandwidth. It is important to note, however, that the implementation of such an amplifier may not be advantageous where there is a significant amount of undesirable interference signals, because the desirable and undesirable signals are each amplified by the same amount. Accordingly, the overall signal quality of the upstream bandwidth is not likely increased when such an amplifier is implemented.

For at least the forgoing reasons, a need has been identified for a device that can increase the signal strength of the upstream bandwidth without unnecessarily amplifying undesirable interference signals.

SUMMARY OF THE INVENTION

The present invention helps to reduce the effect of undesirable interference signals that are injected into the local distribution network, through the upstream bandwidth, by the user. By providing means for blocking or terminating a return path for the upstream bandwidth at a time while a respective user does not utilize the upstream bandwidth, any undesirable interference signals generated on the premise of that user are stopped from entering the upstream bandwidth of the local distribution network. Once use of the upstream bandwidth is required by that user (i.e., when the user acquires and uses a modem, a set-top-box, etc), the return path may be locally or remotely enabled allowing the upstream bandwidth to be amplified and passed through to the upstream bandwidth of the local distribution network.

BRIEF DESCRIPTION OF THE DRAWINGS

For a further understanding of the objects of the invention, reference will be made to the following detailed description of the invention which is to be read in connection with the accompanying drawings, where.

The drawings are not necessarily to scale, emphasis instead generally being placed upon illustrating the principles of the invention. In the drawings, like numerals are used to indicate like parts throughout the various views.

DETAILED DESCRIPTION OF THE INVENTION

Figure 1:
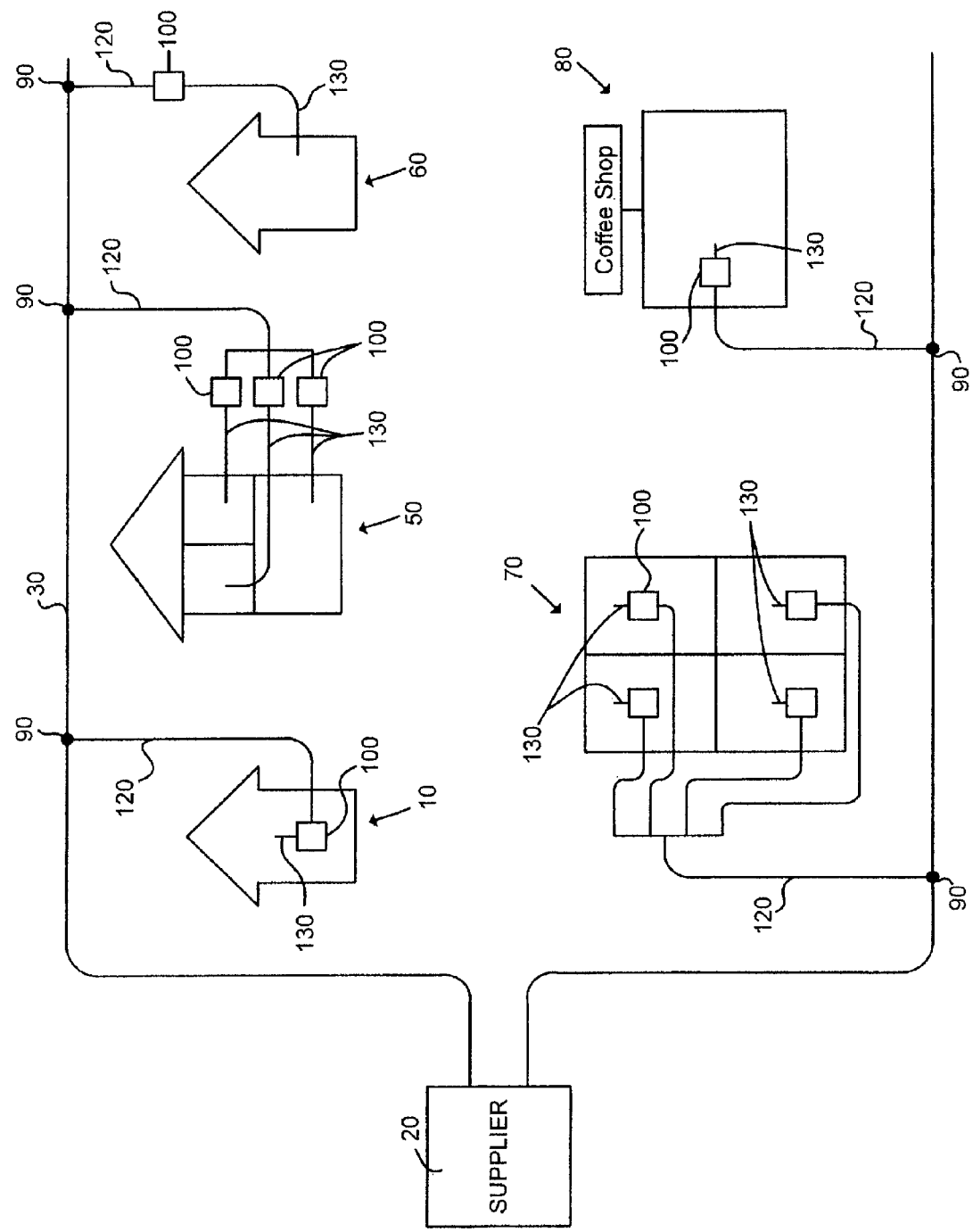
FIG. 1 is a graphical representation of a CATV system arranged in accordance with an embodiment of the present invention.

As shown in FIG. 1, a CATV system typically includes a supplier 20 that transmits a downstream bandwidth, such as RF signals, digital signals, and/or optical signals, to a user through a local distribution network 30 and receives an upstream bandwidth, such as RF signals, digital signals, and/or optical signals, from a user through the same local distribution network 30. A tap 90 is located at the local distribution network 30 to allow for the passage of the downstream/upstream bandwidth to/from the local distribution network 30. A drop transmission line 120 is then used to connect the tap 90 to a house 10, 60, an apartment building 50, 70, a coffee shop 80, and so on. As shown in FIG. 1, an upstream bandwidth conditioning device 100 of the present invention may be typically connected in series between the drop transmission line 120 and a user's premise distribution system 130.

Referring still to FIG. 1, it should be understood that the upstream bandwidth conditioning device 100 can be placed at any location between the tap 90 and the user's premise distribution system 130. This location can be conveniently located within a premise (e.g., the house 10, the apartment building 50, etc.), or proximate to the premise (e.g., the house 60, the apartment building 70, etc.). It should be understood that the upstream bandwidth conditioning device 100 can be placed at any location, such as the coffee shop 80 or other business, where CATV services, including internet services, VOIP services, or other unidirectional/bidirectional services may be used.

Figure 2:
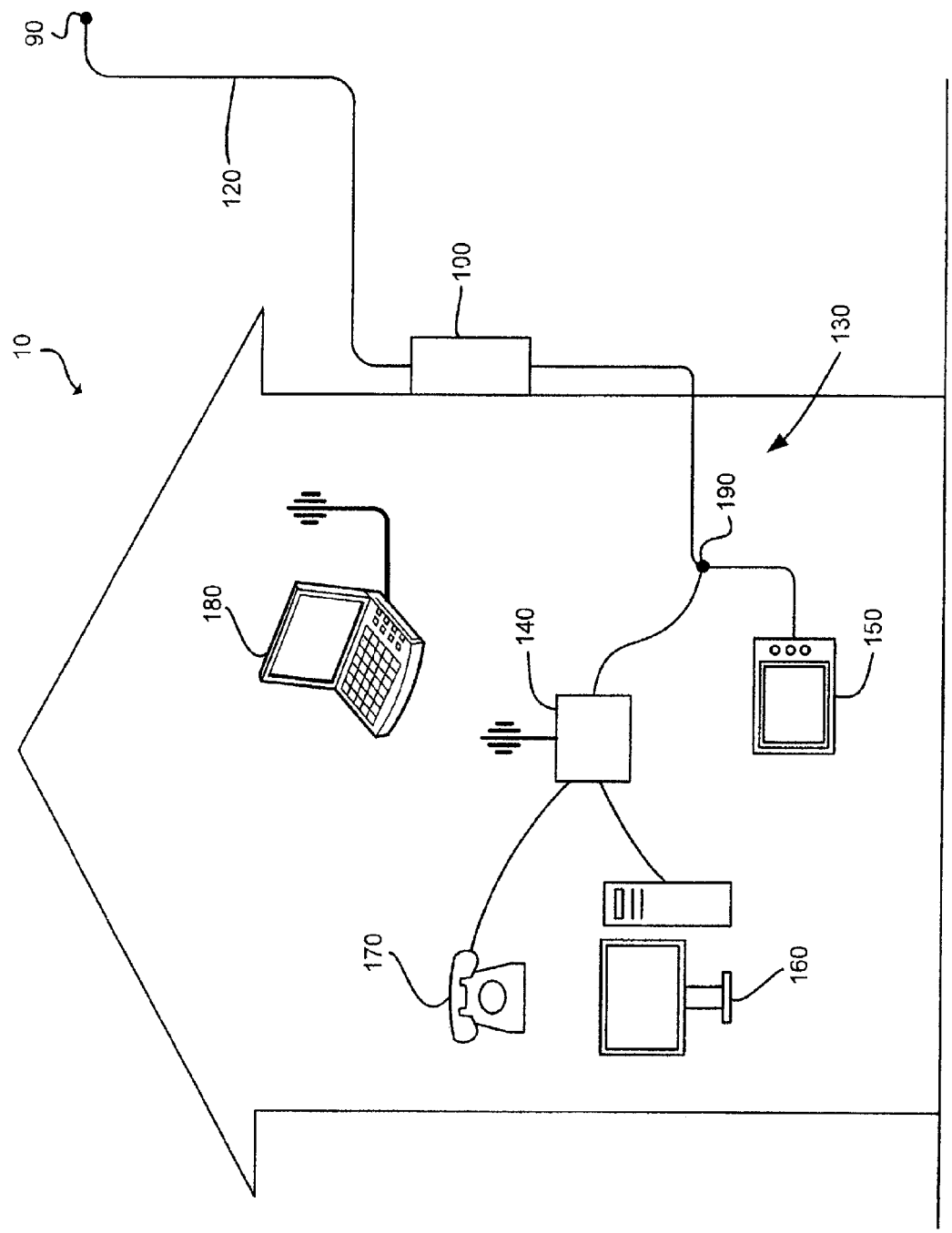
FIG. 2 is a graphical representation of a premise of a user arranged in accordance with an embodiment of the present invention.

As shown in FIG. 2, the user's premise distribution system 130 may be split using a splitter 190 so that the downstream/upstream bandwidth can pass to/from a variety of devices, such as a modem 140 and a television 150, in accordance with practices well known in the art. The modem 140 may include VOIP functionality affording telephone 170 services and may include a router affording internet services for a laptop computer 180 and a desktop computer 160, for example.

Additionally, it is common practice to provide a set-top box ("STB") or a set-top unit ("STU") for use directly with the television 150. For the sake of clarity, however, there is no representation of a STB or a STU included in FIG. 2. The STB and STU are mentioned here in light of the fact that many models utilize the upstream bandwidth to transmit information relating to "pay-per-view" purchases, billing, utilization, and other user interactions, all of which may require information to be sent from the STB or STU to the supplier 20. Accordingly, it should be understood that even though FIG. 2 explicitly shows that there is only one upstream bandwidth conditioning device 100 used for one device (i.e., the modem 140), each upstream bandwidth conditioning device 100 may be used with two or more devices (e.g., a modem, a STB, a STU, and/or a dedicated VOIP server) that transmit desirable upstream information signals via the upstream bandwidth. Many users may not yet subscribe to any premium CATV services, such as the internet, VOIP, Pay-Per-View, etc., that require the use of a modem 140, STB, and/or STU, which create the desirable upstream information signals to be sent in the upstream bandwidth. Nonetheless, significant amounts of undesirable interference signals can be eliminated from the upstream bandwidth in the local distribution network 30 by terminating the return path within the premise of a user that does not subscribe to any these premium services.

Figure 3:
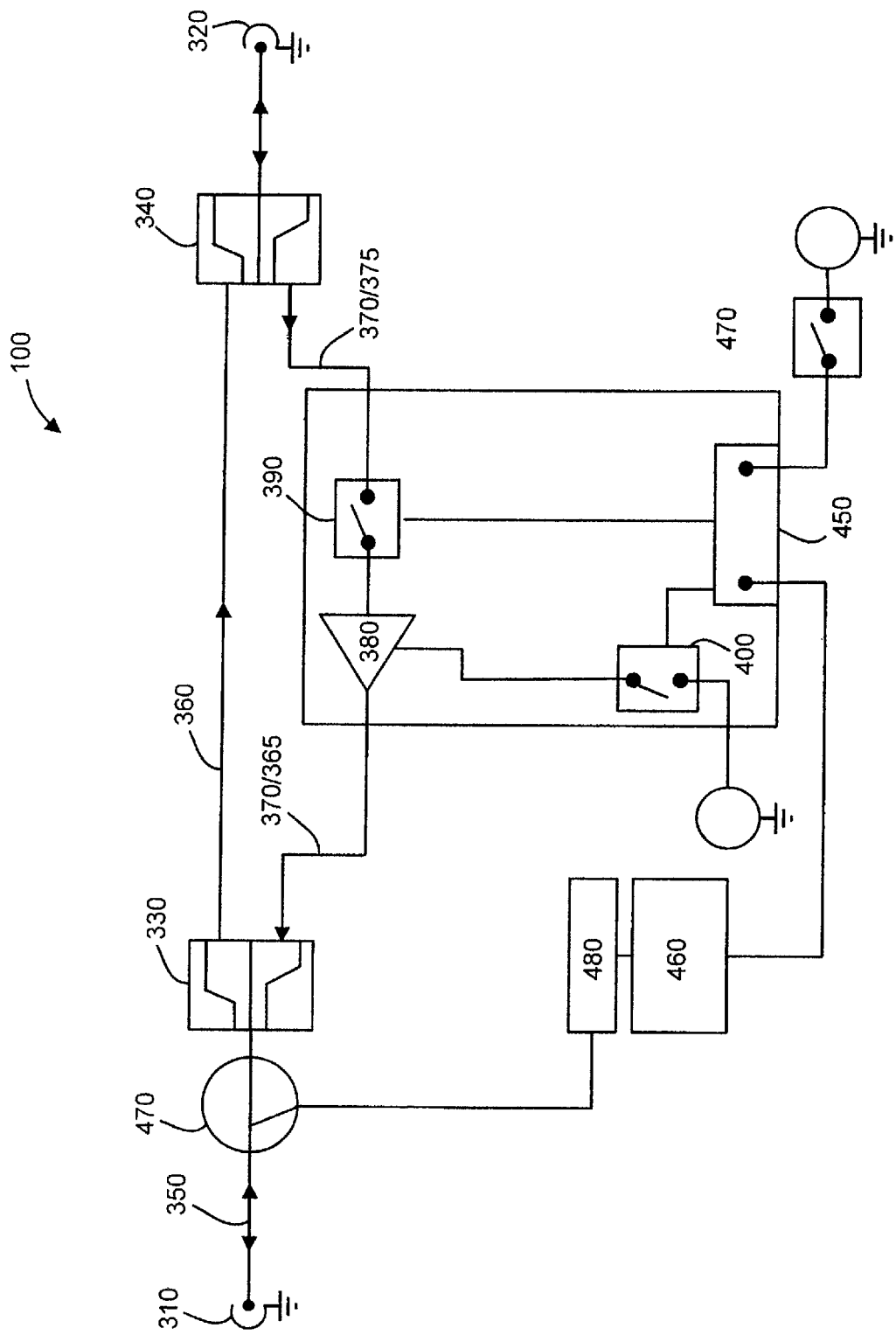
FIG. 3 is a circuit diagram of an upstream bandwidth conditioning device made in accordance with an embodiment of the present invention.

Referring now to FIG. 3, an upstream bandwidth conditioning device 100 made in accordance with one embodiment of the present invention includes a supplier side connector 310 and user side connector 320. The supplier side connector 310 and the user side connector 320 can each be a traditional threaded "F" type 75 ohm connector so that the upstream bandwidth conditioning device 100 can be easily placed in series with the drop transmission line 120 and the premise distribution system 130, which already use "F" type connectors. This "in series" placement ensures that all of the all of the downstream/upstream signals pass through the upstream bandwidth conditioning device 100. It should be understood that each of the supplier side connector 310 and the user side connector 320 may be a a connector other than an "F" type connector. For example, at least one of the connectors 340, 350 may be proprietary connector to hinder attempts at tampering with or unauthorized attempts to access the upstream bandwidth conditioning device 100. Other connector types may also be used depending on the type and/or size of the drop transmission line 120, the premise distribution system 130, or system impedance other than 75 ohms. With regard to the latter, it should be understood that connectors are purposefully varied in some instances to avoid the placement of components having one characteristic impedance (e.g., 75 Ohms) in a system having another characteristic impedance (e.g., 50 Ohms).

The upstream bandwidth conditioning device 100 further includes a supplier side diplexer filter 330 and a user side diplexer filter 340 that create a forward path 360 for the downstream bandwidth and a return path 370 for the upstream bandwidth. Please note that even though there are no signal conditioning devices shown in the forward path 360, known devices, such as signal amplifiers, signal attenuation devices, electrical protection devices, etc. can be included.

The return path 370 includes a signal amplifier 380, which can be any of the well known devices for amplifying a signal, whether it is an electromagnetic signal or an optical signal. The signal amplifier 380 is selectively connected in series with the return path 370 by an amplifier switch 390, which is represented in an open state. In its open state, the amplifier switch 390 effectively splits the return path 370 into two parts, a supplier side portion 365 and a user side portion 375.

While it is not shown in FIG. 3, the amplifying device 380 may be selectively connected to the supplier side portion 365 of the return path 370 in a manner similar to how the signal amplifier 380 is selectively connected to the user side portion 375 of the return path 370 by the amplifier switch 390.

The signal amplification device receives electrical energy via an amplifier energy switch 400, which is represented in an open state. While there may be no injurious effects to providing constant power to the signal amplifier 380, there may be a power savings by not powering the signal amplifier 380 when it is not in use.

Note that the names of the switches (i.e. amplifier switch 390 and amplifier energy switch 400) have been assigned to give clarity to the description. The switches 390 and 400 are typical switches for their intended purposes.

Each of the amplifier switch 390 and the amplifier energy switch 400 are controlled by a switch controller 450. The switch controller may be a CPU, an analog circuit, and/or a simple mechanical connection that actuates each of the switches between a first position and a second position based on an input from a CPU 460 and/or a physical switch 470.

The configuration shown in the embodiment of FIG. 3 is a default position such that the amplifier switch 390 and the amplifier energy switch 400 are in their first position (i.e. an open position). In this first position (i.e. the default position), signals do not pass through the signal amplifier 380 and the signal amplifier 380 is not being powered.

The configuration shown in FIG. 3 is currently intended to be a default configuration for the upstream bandwidth conditioning device 100, because it is believed that such devices would be used in or on the premise of users, who do not subscribe to any service that utilizes the upstream bandwidth. More simply, the present embodiment shown in FIG. 3 defaults to a position with the return path is open and the signal amplifier 380 deactivated. Accordingly, when the physical switch 470 is closed, the switch controller 450 actuates the switches 390, and 400 from their first position (i.e. default position), as shown, to their second positions, which connect and energize the signal amplifier 380. The same action can be initiated by the CPU 460 in the manner discussed below. It should be understood that the embodiment shown in FIG. 3 can be configured such that the second position of the switches 390, 400 is the default position.

The CPU 460 determines whether to instruct the switch controller 450 to activate the switches 390, 400 based on an information transmission signal sent by the supplier 20. A signal coupler 470 allows for a pilot receiver 480 to receive the information transmission signal, such as a tone, a coded operational signal, or other well known information transmission signal that can be understood by the CPU 460 to indicate a desired switch position. For example, the information signal is sampled by the signal coupler 470, and the sampled signal is filtered and sent to the pilot receiver 480 to demodulate and extract the information that will be used by the CPU 460. The frequency of the receiver 480 may be set by the CPU 460 and can be tuned by a phase-locked loop control system (not specifically represented) in a manner that is well known in the art. It should be noted that the CPU 460 can be any one of a variety of devices, such as an analog logic circuit or a microprocessor.

The frequency of the receiver 480 can be set by the CPU 460 and can be tuned in any of the manners that are well known in the art. The receiver 480 may also be fixed to a single frequency if and/or when that frequency is sufficient to carry the desired information transmission signal. It should be understood that the particular frequency is only important to the degree that the receiver 480 must be tuned to a particular frequency where the information transmission signal is expected in order to receive the information transmission signal. In the present instance, the particular frequency is a frequency within a range of 110-135 MHz because the components of the receiver 480, a low power mixer FM IF system SA605DK and clock generator ADF4001, are relatively inexpensive for this frequency range. It should also be understood that the particular frequencies may, as in the present case, be a frequency within a typical CATV channel, but between the video carrier frequency and audio carrier frequency.

In its simplest form, the information transmission signal can be a tone, such as a 100 kHz tone that is RF modulated onto the particular frequency. Is a tone is going to be used as an information transmission signal, the receiver 480 may then include a tone demodulator, which are well known in the art, to identify whether a tone is present and provide an output to the CPU 460 indicating whether a tone is present. More detailed control, possibly to control the amount of amplification by the signal amplifier 380, may also be accomplished by incorporating an information transmission signal that includes a coded operational signal.

A coded operational signal may be provided on the particular frequency along with the tone, or the coded operational signal may be provided by itself on the particular frequency. In the present embodiment, a coded operational signal is RF modulated along with the tone. For example, the coded operational signal is provided at 500 MHz on the particular frequency, and provides for a transfer rate of 2400 baud. To accommodate the tone and the coded operational signal in the present example, the mixer in the receiver 480 provides two outputs, one with a band pass filter to pass the 100 Hz tone to the tone demodulator, and one with a band pass filter to pass the 500 MHz signals to a demodulator, which is well known in the art, to convert the RF signals into a data steam, such as RS232, suitable for use by the CPU 460.

Figure 4:
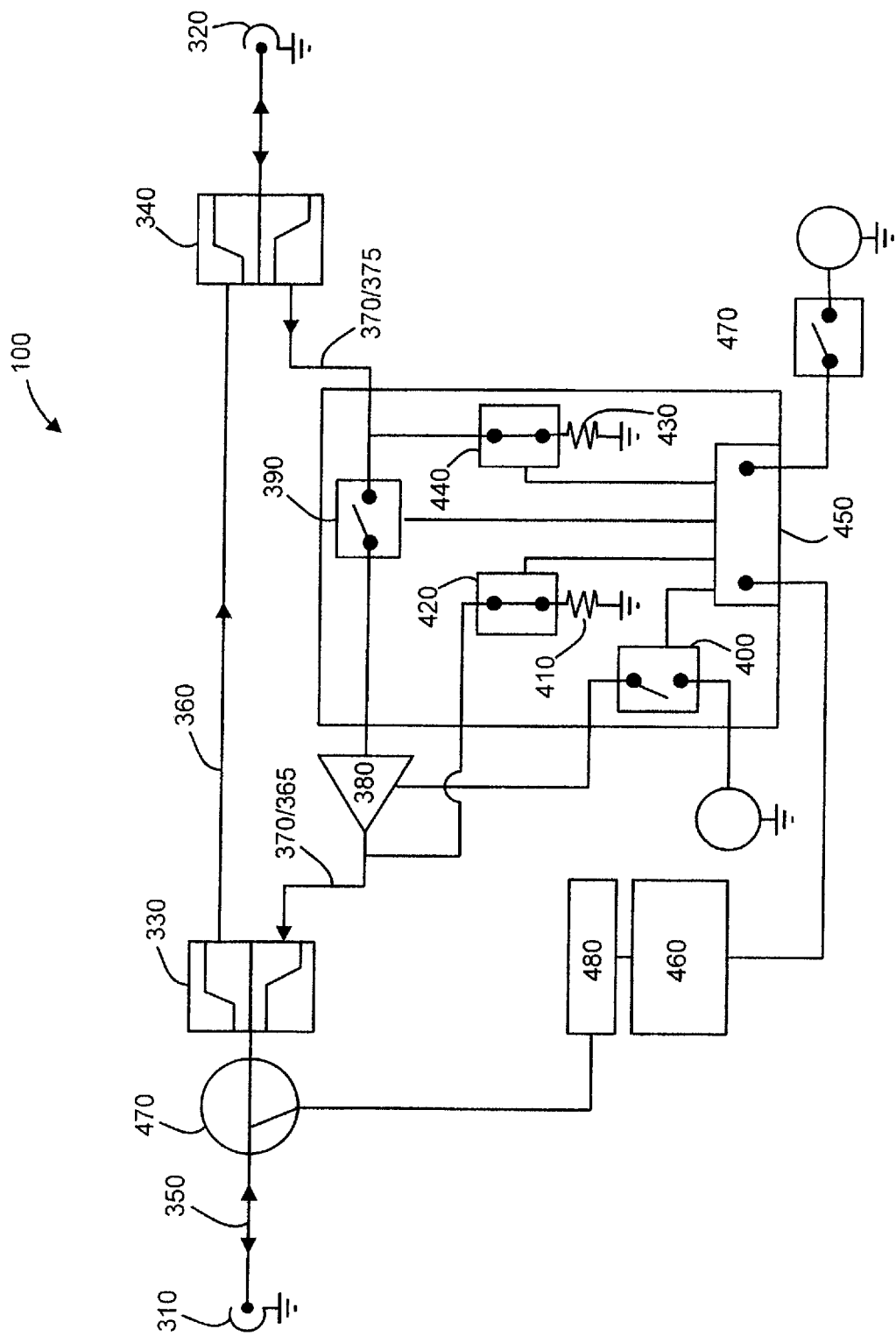
FIG. 4 is a circuit diagram of an upstream bandwidth conditioning device made in accordance with an embodiment of the present invention.

Referring now to FIG. 4, an upstream bandwidth conditioning device 100 made in accordance with another embodiment of the present invention includes all of the features discussed above in relation to FIG. 3 (similar reference numbers identifying similar features). In the present embodiment, the return path 370 includes a supplier side termination device 410 selectively connected in series with the supplier side portion 365 between a ground and the low-pass filter portion of the supplier side diplexer set 330 by a supplier side termination switch 420. Similarly, the return path 370 includes a user side termination device 430 selectively connected in series with the user side portion 375 between the ground and the low-pass filter portion of the user side diplexer set 340 by a user side termination switch 440.

As noted above, the names of the switches (i.e. the supplier side termination switch 420 and user side termination switch 440) have been assigned to give clarity to the description. The switches 420 and 440 are typical switches for their intended purposes.

Each of the amplifier switch 390, the amplifier energy switch 400, supplier side termination switch 420, and the user side termination switch 440 are controlled by the switch controller 450. As discussed above, the switch controller may be a CPU, an analog circuit, and/or a simple mechanical connection that actuates each of the switches between a first position and a second position based on an input from a CPU 460 and/or a physical switch 470.

The configuration shown in the embodiment of FIG. 4 is a default position for the present embodiment such that the amplifier switch 390 and the amplifier energy switch 400 are in their first position (i.e. an open position), and the supplier side termination switch 420 and the user side termination switch 440 are in their first position (i.e. a closed position). In this first position (i.e. the default position), signals do not pass through the signal amplifier 380 and the signal amplifier 380 is not being powered. Also in this first position (i.e. the default position), the supplier side portion 365 of the return path 370 is terminated through the supplier side termination device 410 and the user side portion 375 of the return path 370 is terminated through the user side termination device 430.

As discussed above in relation to FIG. 3, the configuration shown in FIG. 4 is currently intended to be a default configuration for the upstream bandwidth conditioning device 100, because it is believed that such devices would be used in or on the premise of users, who do not subscribe to any service that utilizes the upstream bandwidth. More simply, the present embodiment shown in FIG. 4 defaults to a position with the return path terminated and the signal amplifier 380 deactivated. Accordingly, when the physical switch 470 is closed, the switch controller 450 actuates the switches 390, 400, 420, and 430 from their first position (i.e. default position), as shown, to their second positions, which connect and energize the signal amplifier 380 and disconnect the termination devices 410, 430. The same action can be initiated by the CPU 460 in the manner discussed below. It should be understood that the embodiment shown in FIG. 4 can be configured such that the second position of the switches 390, 400, 420, 440 is the default position. Similar to that discussed above in relation to FIG. 3, the CPU 460 determines whether to instruct the switch controller 450 to activate the switches 390, 400, 420, 440 based on an information transmission signal sent by the supplier 20.

Other embodiments are envisaged that provide a feature level that is in between the embodiment shown in FIG. 3 and the embodiment shown in FIG. 4. For example, an embodiment is envisaged that includes the supplier side termination device 410 and the respective supplier side termination switch 420, but does not include the user side termination device 430 and the respective user side termination switch 440. Such an embodiment may be useful if there is a need to prevent reflections of other upstream bandwidth signals produced by other users. Along these lines, another embodiment is envisaged that includes the user side termination device 430 and the respective user side termination switch 440, but does not include the supplier side termination device 410 and the respective supplier side termination switch. Such an embodiment may be useful if there is a need to prevent reflections of any undesirable interference signals from affecting the downstream bandwidth in the premise.

Another embodiment is envisaged that is similar in form to the embodiment shown in FIG. 3. For example, the amplifier switch 390 may be removed if the amplifier 380 is such that it effectively separates the forward path 370 into the supplier side portion 365 and the user side portion 375. In other words, if the amplifier 380 provides division between the supplier side portion 365 and the user side portion 375 when the amplifier 380 is turned off, the amplifier switch 390 may be eliminated.

As shown explicitly in FIG. 2, there is one upstream bandwidth conditioning device 100 in series between the drop transmission line 120 and the premise distribution system 130. In this instance, the return path is terminated for the entire premise distribution 130 at one time. It is envisaged by the inventors, however, that more than one upstream bandwidth conditioning device 100 may be provided in the premise distribution system. For example, an upstream bandwidth conditioning device 100 may be located on any leg of the premise distribution system 130 after the splitter 190. While only two legs are shown, the leg between the splitter 190 and the modem 140 and the leg between the splitter 190 and the television 150, it should be understood that there may be many legs. The benefit for having such a plurality of upstream bandwidth conditioning devices 100 is that any one leg of the premise distribution system 130 may be terminated if/when there are no devices present on that leg that produce desirable upstream information signals. In such an installation, each of the upstream bandwidth conditioning devices 100 may be separately identifiable and/or controllable such that any one of the upstream bandwidth conditioning devices 100 may be indentified and/or controlled separately from the remaining upstream bandwidth conditioning devices 100.

Figure 5:
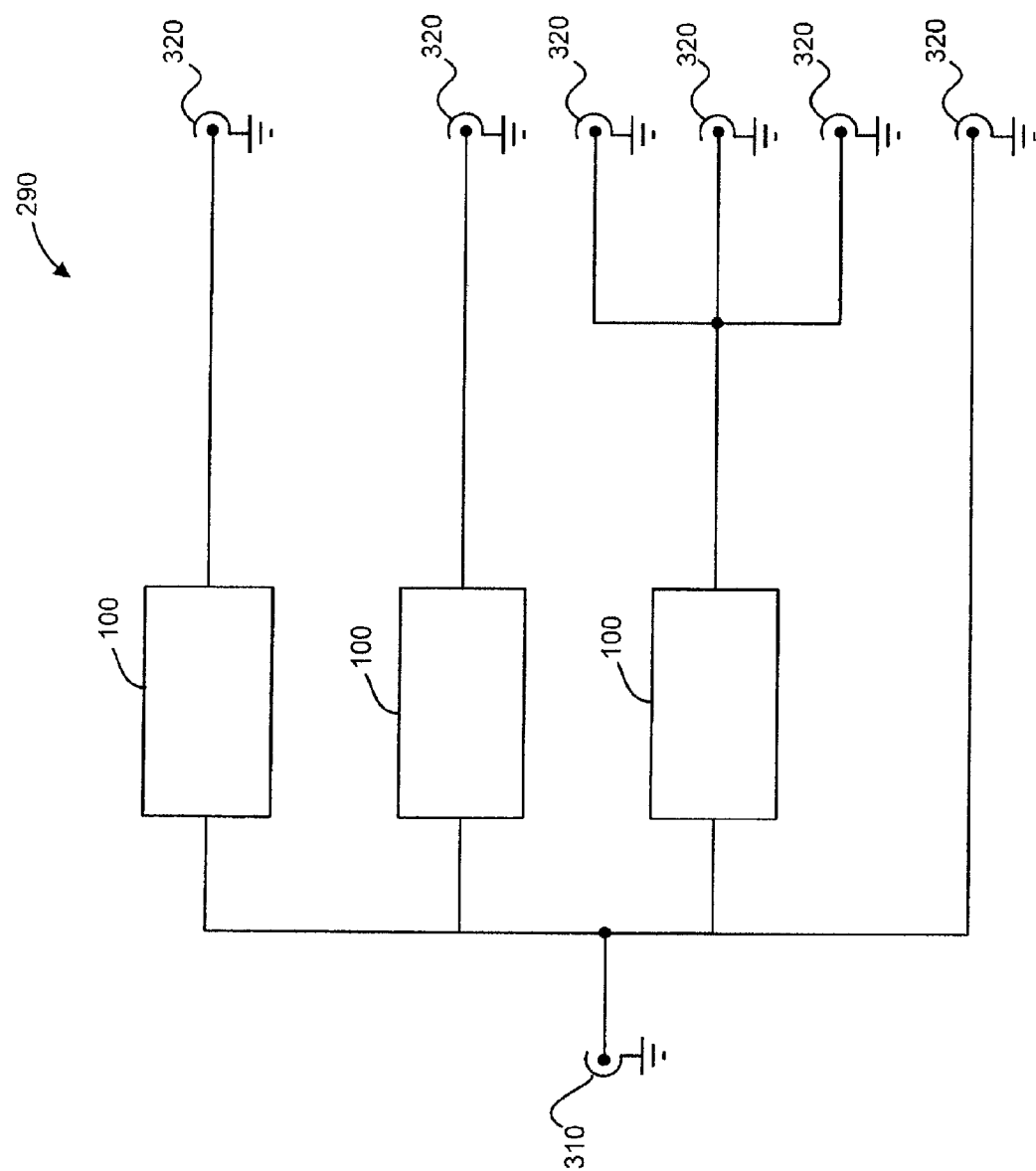
FIG. 5 is a circuit diagram of an upstream bandwidth conditioning device made in accordance with an embodiment of the present invention.

Referring now to FIG. 5, it is also envisaged that the splitter 190 (FIG. 2) may be replaced with a splitter 290, which includes one or more of the upstream bandwidth conditioning devices 100 that may replace the upstream bandwidth conditioning device 100 represented in FIG. 2. As shown in FIG. 5, there may be one upstream bandwidth conditioning device 100 for a single user side connector 320 of the splitter 290, and/or there may be one upstream bandwidth conditioning device associated with two or more user side connectors 320. Further, there may be one or more user side connectors 320 that are not associated with an upstream bandwidth conditioning device. It is envisaged that each of the upstream bandwidth conditioning devices 100 in the splitter 290 may be identified and/or controlled separately from one another either by an informational signal from the supplier 20 and/or by a user/technician on site. If such a splitter 290 is implemented, the upstream bandwidth conditioning device 100 represented may not be present, but could remain for the purpose of terminating the return path for the entire premise.

While the present invention has been particularly shown and described with reference to the preferred mode as illustrated in the drawings, it will be understood by one skilled in the art that various changes in detail may be effected therein without departing from the spirit and scope of the invention as defined by the claims.

The invention claimed is:

1. An upstream bandwidth conditioning device that can be inserted into a signal transmission line of a CATV system in or proximate to a premise of a user, said device comprising:
   a main signal path divided into a forward path and a return path, the return path being divided into a supplier side portion and a user side portion;
   at least one amplifier switch;
   a signal amplifier selectively connected to the supplier side portion and the user side portion by the at least one amplifier switch, wherein the signal amplifier is configured to increase an upstream bandwidth signal strength on the return path;
   a switch controller configured to actuate the amplifier switch from a first position to a second position;
   a supplier side termination switch;
   a supplier side termination device selectively connected to the supplier side portion by the supplier side termination switch, wherein the supplier side termination switch selectively connects the supplier side termination device to an output of the signal amplifier and a supplier side diplex filter so as to prevent amplification of undesirable interference signals on the return path;
   a user side termination switch;
   a user side termination device selectively connected to the user side portion by the user side termination switch, wherein the user side termination switch selectively connects the user side termination device to the at least one amplifier switch and a user side diplex filter so as to further prevent the amplification of the undesirable interference signals on the return path, and wherein the switch controller is configured to actuate each of the supplier side termination switch and the user side termination switch from a first position to a second position; and an amplifier energy switch selectively connecting an energy source to the signal amplifier for selectively energizing the signal amplifier.

2. The upstream bandwidth conditioning device of claim 1, wherein the switch controller is configured to actuate the at least one amplifier switch from the first position to the second position in response to an input from at least one of a controller, the controller being selected from the group consisting of a physical switch, an analog logic circuit, and a CPU.

3. The upstream bandwidth conditioning device of claim 2, wherein the controller is configured to provide the input to the switch controller based on an information signal passed through the main signal path.

4. The upstream bandwidth conditioning device of claim 3, wherein the information signal is at least one of a coded operational signal and a tone.

5. The upstream bandwidth conditioning device of claim 1, wherein the supplier side termination device and the user side termination device each provide a resistance to ground.

6. The upstream bandwidth conditioning device of claim 5, wherein the resistance to ground is 75 ohms.

7. The upstream bandwidth conditioning device of claim 1, wherein the switch controller is configured to actuate the supplier side termination switch, the user side termination switch, and the at least one amplifier switch from the first position to the second position in response to an input from a controller, the controller being at least one of a physical switch, an analog logic circuit, and a CPU.

8. The upstream bandwidth conditioning device of claim 7, wherein the controller is configured to provide the input to the switch controller based on an information signal passed through the main signal path.

9. The upstream bandwidth conditioning device of claim 8, wherein the information signal is at least one of a coded operational signal and a tone.

10. The upstream bandwidth conditioning device of claim 1, wherein the main signal path is divided into the forward and the return path by a pair of diplexer filters.

11. The upstream bandwidth conditioning device of claim 1, wherein the first position for each of the supplier side termination switch and the user side termination switch is closed such that each of the supplier side portion and the user side portion are terminated to ground through the supplier side termination and the user side termination, respectively.

12. The upstream bandwidth conditioning device of claim 1, wherein the first position for the at least one amplifier switch is open such that a signal does not pass from the user side portion to the supplier side portion.

13. The upstream bandwidth conditioning device of claim 1, wherein the second position for each of the supplier side termination switch and the user side termination switch is open such that each of the supplier side portion and the user side portion are disconnected from ground.

14. The upstream bandwidth conditioning device of claim 1, wherein the second position for the at least one amplifier switch is closed such that a signal passes from the user side portion to the supplier side portion.

15. A splitter device comprising:
an input connector;
a plurality of user side connectors; and
at least one upstream bandwidth conditioning device according to claim 1 being associated with at least one of the user side connectors.

16. A device according to claim 15, wherein each upstream bandwidth conditioning device is associated with a separate user side connector.

17. A device according to claim 15, wherein one of the upstream bandwidth conditioning devices is associated with more than one of the user side connectors.

18. A method for selectively alternating between a return path termination and an upstream bandwidth signal amplification using a device located in or proximate to a premise of a user, the method comprising:
providing a main signal path divided into a forward path and a return path, the return path being divided into a supplier side portion and a user side portion;
providing a signal amplifier selectively connected to the supplier side portion and the user side portion by at least one amplifier switch, wherein the signal amplifier is configured to increase an upstream bandwidth signal strength on the return path;
switching, by a switch controller device, the at least one amplifier switch from a first position to a second position in response to an input signal;
providing a supplier side termination switch;
providing a supplier side termination device selectively connected to the supplier side portion by the supplier side termination switch, wherein the supplier side termination switch selectively connects the supplier side termination device to an output of the signal amplifier and a supplier side diplex filter so as to prevent amplification of undesirable interference signals on the return path;
providing a user side termination device selectively connected to the user side portion by a user side termination switch;
switching each of the supplier side termination switch and the user side termination switch from a first position to a second position in response to an input signal; and
providing a user side diplex filter so as to further prevent the amplification of the undesirable interference signals on the return path.

19. The method of claim 18, wherein the input signal is a signal from a controller, the controller being one of a physical switch, an analog logic circuit, and a CPU.

20. The method of claim 19, wherein the controller generates the input signal based on an information signal passed through the main signal path.

21. The method of claim 18, wherein the first position of the supplier side termination switch and the first position of the user side termination switch are closed positions, and the first position of the at least one amplifier switch is an open position.

22. The method of claim 18, further comprising providing the at least one amplifier switch selectively connecting the signal amplifier with a power source.

23. The method of claim 18, further comprising:
providing a user side termination switch, wherein the user side termination switch selectively connects the user side termination device to the at least one amplifier switch.

24. The method of claim 18, further comprising:
providing an amplifier energy switch selectively connecting an energy source to the amplifier for selectively energizing the amplifier.

25. A selective upstream bandwidth noise filtering and signal strength amplification device comprising:

a downstream bandwidth transmission path configured to transmit downstream bandwidth from a supplier to a user;

an upstream bandwidth transmission path configured to transmit upstream bandwidth from the user to the supplier;

an upstream bandwidth amplifier configured to amplify a desirable signal through the upstream bandwidth transmission path; and an upstream bandwidth transmission controller configured to selectively prevent an undesirable interference signal from being transmitted through the upstream bandwidth transmission path only when the upstream bandwidth transmission path is not being used by the user to transmit the desirable signal through the upstream bandwidth transmission path, the controller including a supplier side termination switch, and a supplier side termination device selectively connected to a supplier side portion by the supplier side termination switch, wherein the supplier side termination switch selectively connects the supplier side termination device to an output of the amplifier and a supplier side diplex filter so as to prevent amplification of the undesirable interference signal and selectively allow the desirable signal to be transmitted through the upstream bandwidth transmission path only when the upstream bandwidth transmission path is being used by the user to transmit the desirable signal through the upstream bandwidth transmission path so as to increase desirable upstream bandwidth signal strength without amplifying undesirable interference signal strength, wherein the controller comprises a user side termination switch, and a user side termination device selectively connected to a user side portion by the user side termination switch, and wherein the user side termination switch selectively connects the user side termination device to a user side diplex filter to prevent amplification of the undesirable interference signal.

26. The selective upstream bandwidth noise filtering and signal strength amplification device of claim 25, wherein the undesirable interference signal comprises noise.

27. The selective upstream bandwidth noise filtering and signal strength amplification device of claim 25, wherein the controller includes an amplifier switch and the upstream bandwidth transmission path includes the supplier side portion selectively connected to the amplifier and a user side portion selectively connected to the amplifier switch.

28. The selective upstream bandwidth noise filtering and signal strength amplification device of claim 27, wherein the user side termination switch selectively connects the user side termination device to the amplifier switch, and the user side termination device and the user side termination switch are configured to prevent the amplification of the undesirable interference signal.

29. The selective upstream bandwidth noise filtering and signal strength amplification device of claim 25, wherein the controller comprises an amplifier energy switch configured to selectively connect an energy source to the amplifier for selectively energizing the amplifier.

30. A signal conditioning device comprising:
a supplier side diplexer configured to receive and transmit downstream information signals, and upstream information signals on a return path;
a user side diplexer configured to receive and transmit the downstream information signals, and the upstream information signals on the return path;
an amplifier connected in series between the user side diplexer and the supplier side diplexer for amplifying the upstream information signals on the return path;
an amplifier energy switch connected to the amplifier and to an energy source for energizing the amplifier, thereby enabling the amplifier to amplify the upstream information signals, when the amplifier energy switch is closed;
an amplifier switch connected in series between the user side diplexer and the amplifier for enabling the amplifier to amplify the upstream information signals;
a user side termination switch connected to the user side diplexer in parallel with the amplifier switch, the user side termination switch also connected to a grounded user side termination device such that noise transmitted by the user side diplexer is grounded when the user side termination switch is closed; and
wherein the supplier side diplexer and the user side diplexer are configured to cooperate together so as to prevent amplification of undesirable signals on the return path.

31. The signal conditioning device of claim 30, further comprising:
an amplifier connected in series between the user side diplexer and the supplier side diplexer for amplifying the upstream information signals on the return path.

32. The signal conditioning device of claim 31, further comprising:
an amplifier energy switch connected to the amplifier and to an energy source for energizing the amplifier, thereby enabling the amplifier to amplify the upstream information signals, when the amplifier energy switch is closed.

33. The signal conditioning device of claim 32, further comprising:
the amplifier switch being connected in series between the user side diplexer and the amplifier for enabling the amplifier to amplify the upstream information signals.

34. The signal conditioning device of claim 30, further comprising:
a supplier side termination switch connected to the supplier side diplexer in parallel with the amplifier, the supplier side termination switch also connected to a grounded supplier side termination device such that the noise transmitted by the user side diplexer is grounded when the supplier side termination switch is closed.

35. The signal conditioning device of claim 34, further comprising:
a switch controller connected to the amplifier energy switch, the amplifier switch, the supplier side termination switch, and the user side termination switch for selectively opening and closing any of said amplifier energy switch, amplifier switch, supplier side termination switch, and user side termination switch.

36. The signal conditioning device of claim 35, wherein the switch controller is configured to perform said opening and closing any of said switches in response to an information transmission signal from a supplier.

37. The signal conditioning device of claim 36, wherein a first configuration of the switches comprises the amplifier switch and the amplifier energy switch each in an open position, such that none of the noise passes through the amplifier.

38. The signal conditioning device of claim 37, wherein the first configuration of the switches further comprises the supplier side termination switch and the user side termination switch each in a closed position.

39. The signal conditioning device of claim 36, wherein a first configuration of the switches comprises the amplifier switch and the amplifier energy switch each in a closed position, such that the amplifier amplifies the upstream information signals from a user transmitted by the user side diplexer.

40. The signal conditioning device of claim 39, wherein the first configuration of the switches further comprises the supplier side termination switch and the user side termination switch each in an open position.

41. The signal conditioning device of claim 30, wherein the signal conditioning device is configured to be spliced into a drop transmission line by coupling the supplier side diplexer to a supplier side of the drop transmission line and coupling the user side diplexer to a user side of the drop transmission line.

42. A signal conditioning device comprising:
   a supplier side diplexer configured to receive and transmit downstream information signals, and upstream information signals on a return path;
   a user side diplexer configured to receive and transmit the downstream information signals, and the upstream information signals on the return path; and
   a switch controller connected to an amplifier energy switch for selectively closing and opening the amplifier energy switch, thereby enabling and disabling the amplifier, respectively;
   wherein the supplier side diplexer and the user side diplexer are configured to cooperate together so as to prevent amplification of undesirable signals on the return path; and
   wherein the switch controller is configured to perform said opening and closing of the amplifier energy switch in response to an information transmission signal from the supplier.

43. A signal conditioning device comprising:
   a first circuit portion configured to receive downstream information signals from a supplier, transmit the downstream information signals to a user, receive upstream information signals from the user, and transmit the upstream information signals on a return path to the supplier;
   second circuit portion configured to receive the downstream information signals, transmit the downstream information signals to the user, receive the upstream information signals from the user, and transmit the upstream information signals on the return path;
   an amplifier connected in series between the first and second circuit portions for amplifying the upstream information signals on the return path;
   an amplifier switch connected in series between the first and second circuit portions for enabling the amplifier to amplify the upstream information signals; and
   a user side termination switch connected to the second circuit portion in parallel with the amplifier switch, the user side termination switch also connected to a grounded user side termination device such that undesirable signals transmitted by the second circuit portion are grounded when the user side termination switch is closed; and
   wherein the first and second circuit portions are configured to cooperate together so as to substantially prevent transmission of the undesirable signals on the return path.

44. A signal conditioning device comprising:
   a first circuit portion configured to receive downstream information signals from a supplier, transmit the downstream information signals to a user, receive upstream information signals from the user, and transmit the upstream information signals on a return path to the supplier; and
   a second circuit portion configured to receive the downstream information signals, transmit the downstream information signals to the user, receive the upstream information signals from the user, and transmit the upstream information signals on the return path;
   an amplifier connected in series between the first and second circuit portions for amplifying the upstream information signals on the return path; and
   a supplier side termination switch connected to the first circuit portion in parallel with the amplifier, the supplier side termination switch also connected to a grounded supplier side termination device such that undesirable signals transmitted by the second circuit portion are grounded when the supplier side termination switch is closed; and
   wherein the first and second circuit portions are configured to cooperate together so as to substantially prevent transmission of the undesirable signals on the return path.

45. The signal conditioning device of claim 44, wherein the first circuit portion comprises a user side diplexer, and the second circuit portion comprises a supplier side diplexer, the signal conditioning device comprising:
   an amplifier energy switch connected to the amplifier and to an energy source for energizing the amplifier, thereby enabling the amplifier to amplify the upstream information signals, when the amplifier energy switch is closed;
   an amplifier switch connected in series between the user side diplexer and the amplifier for enabling the amplifier to amplify the upstream information signals; and
   a switch controller connected to the amplifier energy switch for selectively closing and opening the amplifier energy switch, thereby enabling and disabling the amplifier, respectively.

46. The signal conditioning device of claim 45, further comprising:
   a user side termination switch connected to the user side diplexer in parallel with the amplifier switch, the user side termination switch also connected to a grounded user side termination device such that noise transmitted by the user side diplexer is grounded when the user side termination switch is closed.

47. The signal conditioning device of claim 45, wherein the signal conditioning device is configured to be spliced into a drop transmission line by coupling the supplier side diplexer to a supplier side of the drop transmission line and coupling the user side diplexer to a user side of the drop transmission line.

48. The signal conditioning device of claim 47, further comprising:
   an amplifier energy switch connected to the amplifier and to an energy source for energizing the amplifier, thereby enabling the amplifier to amplify the upstream information signals, when the amplifier energy switch is closed.

49. The signal conditioning device of claim 47, further comprising:
   an amplifier switch connected in series between the first and second circuit portions for enabling the amplifier to amplify the upstream information signals.

50. The signal conditioning device of claim 44, further comprising:
   a user side termination switch connected to the second circuit portion in parallel with an amplifier switch, the user side termination switch also connected to a grounded user side termination device such that the undesirable signals transmitted by the second circuit portion are grounded when the user side termination switch is closed.

* * * * *